United States Patent [19]
van der Lely et al.

[11] Patent Number: 6,155,204
[45] Date of Patent: Dec. 5, 2000

[54] APPARATUS FOR AND A METHOD OF CLEANING AN ANIMAL'S TEATS AND FOREMILKING

[75] Inventors: Ary van der Lely, Maasland; Karel van den Berg, Bleskensgraaf, both of Netherlands

[73] Assignee: Maasland N.V., Maasland, Netherlands

[21] Appl. No.: 08/667,798

[22] Filed: Jun. 20, 1996

Related U.S. Application Data

[63] Continuation of application No. PCT/NL95/00356, Oct. 17, 1995, abandoned.

[30] Foreign Application Priority Data

Oct. 31, 1994 [NL] Netherlands .......................... 9401802

[51] Int. Cl.$^7$ .............................. A01J 5/00; A01J 5/007; A01J 7/04
[52] U.S. Cl. .................................... 119/14.02; 119/14.08; 119/14.25; 119/670; 119/14.14; 119/14.15
[58] Field of Search .............................. 119/14.02, 14.08, 119/14.14, 14.15, 14.24, 14.25, 670

[56] References Cited

U.S. PATENT DOCUMENTS

| | | | |
|---|---|---|---|
| 3,554,166 | 1/1971 | Belden | 119/159 |
| 3,763,828 | 10/1973 | Tighe | 119/158 |
| 4,034,713 | 7/1977 | Umbaugh | 119/14.02 |
| 5,195,455 | 3/1993 | van der Lely et al. | 119/14.03 |
| 5,383,423 | 1/1995 | van der Lely | 119/158 |
| 5,390,627 | 2/1995 | van den Berg et al. | 119/14.08 |

FOREIGN PATENT DOCUMENTS

| | | | |
|---|---|---|---|
| 0 189 954 A1 | 8/1986 | European Pat. Off. | A01K 1/12 |
| 0 222 574 A2 | 5/1987 | European Pat. Off. | A01J 5/04 |
| 0 323 444 A2 | 7/1989 | European Pat. Off. | A01J 7/00 |
| 0 332 230 A2 | 9/1989 | European Pat. Off. | A01K 1/12 |
| 0 349 019 B1 | 1/1990 | European Pat. Off. | A01J 5/08 |
| 0 389 013 A1 | 9/1990 | European Pat. Off. | A01K 1/12 |
| 0 476 771 A1 | 3/1992 | European Pat. Off. | A01K 13/00 |
| 0 572 068 A2 | 12/1993 | European Pat. Off. | A01K 13/00 |
| 0 630 560 A1 | 12/1994 | European Pat. Off. | A01J 7/00 |
| 8602505 | 5/1988 | Netherlands | A01K 1/12 |
| 1366-123 | 1/1988 | U.S.S.R. | |
| 93/ 06716 | 4/1993 | WIPO | A01J 7/00 |

OTHER PUBLICATIONS

International Search Report, PCT/NL95/00356, prepared by EPO as ISA, dated Feb. 2, 1996, (3 Pages).

*Primary Examiner*—Daniel J. Colilla
*Attorney, Agent, or Firm*—Penrose Lucas Albright

[57] ABSTRACT

An apparatus for milking animals comprising a milking compartment including a milking robot for automatically connecting and disconnecting teat cups from the animal's teats and for automatically milking the animal. Embodiments of cleaning members for automatically cleaning the teats of the animal before the teat cups are connected thereto are disclosed. The cleaning members include mechanisms applied to the teats of the animal for removing the foremilk therefrom before the milking operation, as such, commences. In lieu of the cleaning members which not only automatically clean the teats of the animal but also remove the foremilk, another group of teat cups are optimally provided for this purpose. The cleaning members comprise two-rotating elements of various cross-sections. Their phases of the rotation or the distance between their axes of rotation or the shape of the elements or a combination thereof can be selectively modified to remove foremilk or to clean the teats.

35 Claims, 5 Drawing Sheets

APPARATUS FOR AND A METHOD OF CLEANING AN ANIMAL'S TEATS AND FOREMILKING

RELATED APPLICATION

This is a Continuation Application of PCT Application PCT/NL95/00356, filed Oct. 17, 1995, now abandoned.

FIELD OF THE INVENTION

The invention relates to an apparatus for and method of milking animals, such as cows, comprising a milking compartment including a robot for automatically connecting teat cups to and disconnecting them from the teats of an animal, for automatically milking the animal, and for automatically cleaning the teats of the animal before the teat cups are connected thereto. In particular, it relates to an apparatus and method for foremilking an animal prior to the milking operation, as such.

BACKGROUND OF THE INVENTION

Various types of apparatus for cleaning an animal's teats in conjunction with an automatic milking process are known. However, in spite of the fact that the teat cups are connected to cleaned teats, often the milk obtained is contaminated even though neither mastitis nor any other infective disease is diagnosed because the animal's foremilk was not removed from the teats.

SUMMARY OF THE INVENTION

In order to provide a better guarantee for the milk quality, the above-defined apparatus, according to the invention, is characterized in that it comprises means for automatically removing foremilk from the teats of the animal, which means are activated before the teat cups are connected for milking the usable milk of said animal. In particular foremilk remaining in the teat's cavities will rather often be the cause of the above-mentioned deterioration of the milk quality. The said means for removing foremilk can be activated independently of the cleaning means and the means for milking of usable milk. For example, the means for removing foremilk may be constituted by a second group of teat cups which can automatically be connected to and disconnected from the teats of an animal. Although, in that case, the means for removing foremilk may be activated before the cleaning of the teats, it is preferred to remove foremilk immediately before the operation of milking usable milk is started.

In an advantageous combination from a constructional point of view, the means for removing foremilk, according to the invention, are constituted by the cleaning means themselves. In this case, the cleaning means are preferably active in a cleaning mode and subsequently in a foremilking mode. In particular, during a fraction of the time required for cleaning a teat, foremilk is removed from the teat involved. For example, when a teat has been cleaned for about thirty seconds, immediately thereafter foremilk can be removed in a few seconds by the same cleaning means.

In a first embodiment according to the invention, the cleaning means comprise two rotating elements having a circular cross-section. To shift from the cleaning mode to the foremilking mode, the distance between these elements is adjustable. The two elements may also be vertically movable. Further, at least one of the elements may be capable of being driven eccentrically.

In a second embodiment according to the invention, the cleaning means comprise two rotating elements wherein to be able to change from the cleaning mode to the foremilking mode, at least one of the elements is deformable or the elements can be brought in a different position or in a different condition of movement in relation to each other or a combination thereof. Also in this embodiment it will be possible, when shifting from the cleaning mode to the foremilking mode, to make the distance between the cleaning elements adjustable or to make the two cleaning elements vertically movable or both. In particular, one of the rotating elements can be deformable in such a way that at its circumference one or a plurality of bulges or recesses are provided for the purpose of removing foremilk. In this second embodiment it is also possible that at least one of the rotating elements has a noncircular configuration. In such case, in particular, at least one of the rotating elements can be provided at its circumference with one or a plurality of bulges.

According to another aspect of the invention, the speed at which the rotating elements are driven, the reciprocating motion or the eccentric motion of the element or elements, or a combination thereof, can be such that a pulsatory action can be effected on a teat, that is a pulsation frequency which is attuned to removing foremilk.

In a third embodiment according to the invention, the cleaning means comprise a rotating element constituted by a central shaft or roller, about which and parallel to which there are arranged a number of satellite rollers. In the foremilking mode, the satellite rollers can be freely rotatable about their own longitudinal axes and, in the cleaning mode, they can be fixed in relation to the central shaft or roller. Depending on the number of satellite rollers, the speed at which the rotating elements are driven can be such that a pulsatory action can be effected on a teat, that is a pulsatory frequency which is attuned to removing foremilk.

Both individually and in combination with the aforementioned second or third embodiment, the cleaning means can comprise two rotating elements which are, in relation to each other, adjustable in phase in their direction of rotation, provided that both rotating elements do not have a circular cross-section. This adjustability in phase can depend on the relevant animal.

Also both individually and in combination with any one of the preceding embodiments, the cleaning means can comprise two rotating elements, of which the number of revolutions or the mutual distance or the extent to which the mutual distance varies on rotation of the elements or a combination thereof are adjustable. The number of revolutions, the adjustability of the distance or the adjustability of the extent to which the mutual distance varies on rotation of the elements, can also here again depend on the relevant animal.

According to a further aspect of the invention, the rotating elements in the aforesaid embodiments can be rotatable about substantially horizontal axes in a frame which is movable in the longitudinal direction of the compartment in which the animal to be milked is standing, as well as in a transverse direction and in an upward direction. During a downward motion of the rotating elements, foremilk can be removed.

According to a still further aspect of the invention, a sensor can be provided to detect whether or not foremilk has been removed. This sensor can be located in the same frame in which the rotating elements are arranged. In a particular embodiment, the sensor is sensitive to temperature. The application of such a sensor enables removal of foremilk during a fixed time from the moment which foremilk has been detected by the sensor. When the foremilking has started, but after a certain time, e.g. after from three to six seconds, still no foremilk has been detected, the pressure applied on the teats by the means for removing foremilk can be increased. Furthermore, means can be provided to check the foremilk collected, e.g., its color, electrical conductivity, filter resistance, etc., and, depending on the results of this check, to determine the time during which foremilk is removed. The time it takes to remove foremilk can again depend on the relative animal. In particular, this time can depend on the time elapsed since the previous milking run of the animal.

In addition, the foremilk can be discharged to a separate tank.

BRIEF DESCRIPTION OF THE DRAWINGS

For a better understanding of the invention and to show how the same may be carried into effect, reference will now be made, by way of example, to the accompanying drawings, in which:

in FIG. 4A the cleaning means are represented in the foremilking mode and in FIG. 4B in the cleaning mode;

FIGS. 6A and 6B show in cross-sections a roller for the cleaning means which is deformable; in FIG. 6A the roller is represented in the cleaning mode and in FIG. 6B in the foremilking mode;

FIGS. 7A and 7B similarly show in cross-sections another type of roller for the cleaning means which is also deformable; in FIG. 7A the roller is represented in the cleaning mode and in FIG. 7B in the foremilking mode;

FIGS. 8A and 8B show in side elevational cross-sectional views a different cleaning means, the two rotating elements having an oval shape; in FIG. 8A the cleaning means are represented in the foremilking mode and in FIG. 8B in the cleaning mode;

FIGS. 10A, 10B and 10C show the cleaning means of which the rotating elements each have three bulges; in FIG. 10A the cleaning means are represented in the foremilking mode; FIG. 10B the cleaning rollers are each displaced 60° in phase in relation to the position shown in FIG. 10A to intensify the foremilking; and in FIG. 10C wherein one of the cleaning rollers is displaced 60° relative to the other, the cleaning mode is represented.

BRIEF DESCRIPTION OF THE PREFERRED EMBODIMENTS

Figure 1:
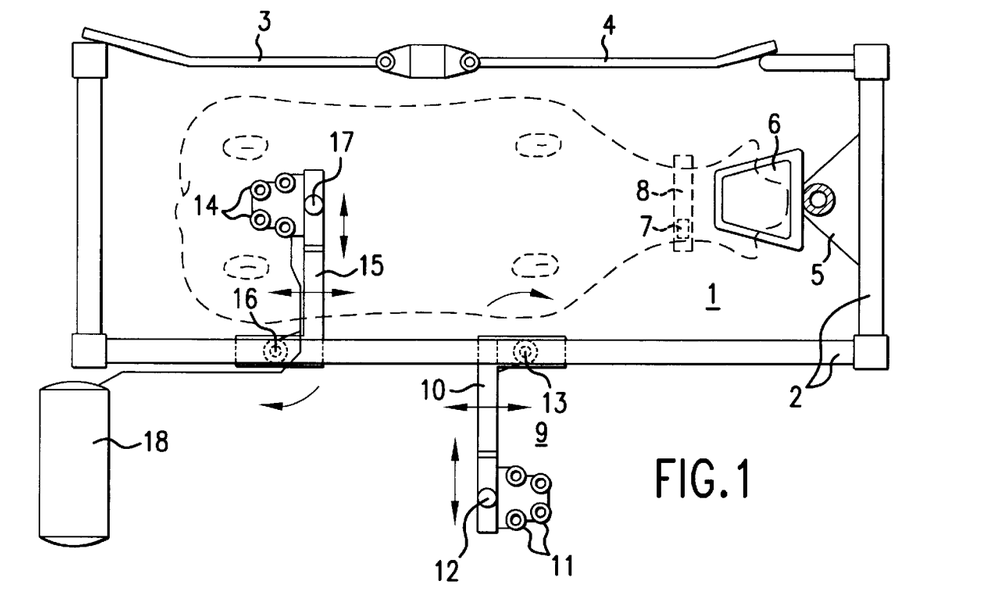
FIG. 1 is a top plan view of a milking compartment which shows a first embodiment of the apparatus according to the invention, in which embodiment the means for removing foremilk are constituted by a second group of teat cups arranged next to the group of teat cups already present for the milking proper of the animal.

In the embodiment shown in FIG. 1, the apparatus for milking animals, such as cows, comprises a milking compartment 1, which is confined by a railing 2 and two gates or doors 3 and 4. Through the entrance door 3 an animal can enter the milking compartment, while the animal can leave the milking compartment through the exit door 4. Furthermore, milking compartment 1 comprises an automatic feeding system 5 including a feed trough 6. Near feed trough 6, a sensor is arranged which cooperates with a transponder 7 fitted on the collar 8 of the animal. The sensor is connected to a computer system and together with transponder 7 constitutes a known animal identification system. By means of this animal identification system, animals entering the milking compartment are identified. After the animal is so identified, data pertaining to the relevant animal in the computer become accessible. This file contains data in respect of the animal's feeding and other data relevant to milking of the animal. Among such data are data concerning the position of the animal's teats in relation to a certain reference point. Partly on the basis of such data, a milking cluster can be positioned under the udder of the animal. Furthermore the apparatus is provided with a milking robot 9, which is indicated only schematically in FIG. 1. This milking robot comprises a robot arm 10, on the end of which are arranged teat cups 11 and a detector 12, preferably a laser detector. The robot arm 10 is pivotable about a shaft 13 in such a way that the robot arm, which in its condition of rest is arranged outside the milking compartment, can be pivoted under the udder of the animal; to this end the robot arm, of course, has to be movable in the longitudinal direction so it can be positioned under the udder which is disposed between the animal's forelegs and hindlegs. Apart from being movable in the longitudinal direction of the milking compartment, robot arm 10 is also movable in a transverse and vertical directions. When robot arm 10, inter alia, with the aid of the animal identification data, is positioned under the udder, the position of the teats can be recorded accurately by means of laser detector 12 and cups 11 can subsequently be connected. Then, the milking proper is started.

However, in practice it is often desirable, and sometimes even prescribed, that, before the milking proper takes place, foremilk is removed. Foremilk may rather often have a negative influence on the quality of the milk; in particular the foremilk in the teat cavity may be contaminated or infected. Therefore, the apparatus according to the invention is provided with automatically controlled means for removing foremilk before the teat cups for the milking proper of the animal are connected. Consequently, the foremilk is collected separately from the further milk. In the embodiment represented in FIG. 1, these automatically controlled means are constituted by a second group of teat cups 14, which teat cups 14 can be connected to the teats of an animal in the same manner as teat cups 11 on robot arm 10. To that end, in the embodiment represented in FIG. 1 there is provided a further robot arm 15, which can be pivoted about a shaft 16 to under the udder of the animal; of course, also here the robot arm 15 is movable in the longitudinal direction of the milking compartment in such a way that it can be pivoted between a foreleg ad a hindleg of the animal on the side of milking compartment involved. At the end of robot arm 15 there is arranged the second group of teat cups 14, near which an individual detector 17, preferably a laser detector, may be disposed on arm 15. Instead of an individual detector on the robot arms 10 and 15, it is also possible to arrange, apart from these two robot arms, a detector which is pivotable under the animal on a separate arm which is movable in longitudinal, transverse and vertical directions. The foremilk obtained with the aid of the second group of teat cups can be transmitted to and stored separately in a tank 18.

Figure 2:
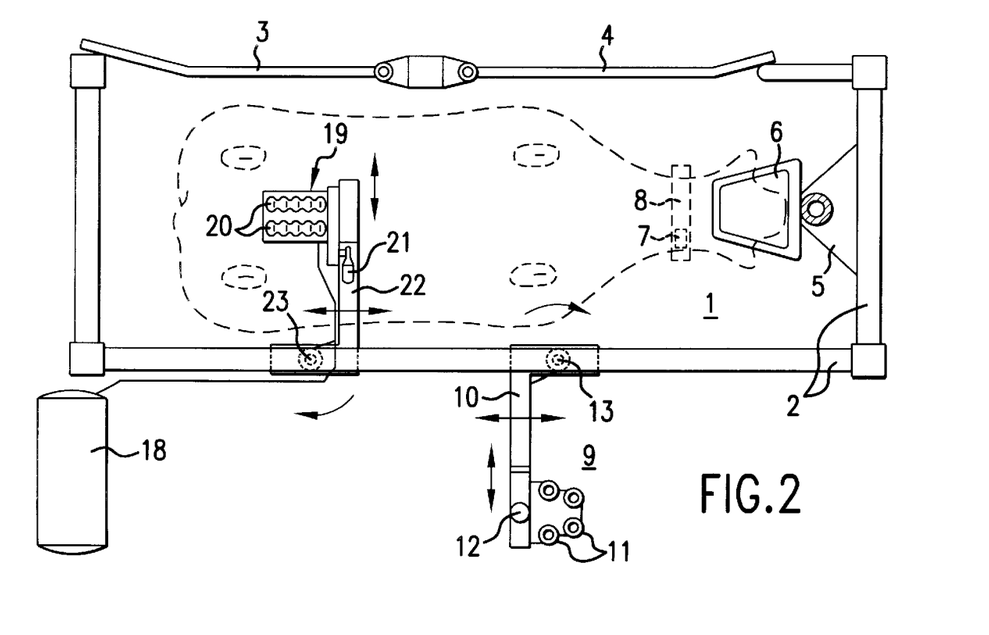
FIG. 2 is a similar view to FIG. 1 which shows a second embodiment of the apparatus according to the invention, in which embodiment the means for removing foremilk are constituted by the cleaning means for cleaning the teats.

Prior to the milking proper of the animal not only should the foremilk be removed, but also the udder or at least the teats of the animal have to be cleaned. According to the invention, the means for removing foremilk can also be constituted by the cleaning means 19. This arrangement is indicated in the embodiment represented in FIG. 2. Cleaning means 19 comprise a pair of motor-driven cleaning rollers 20. The teats to be cleaned are drawn between the two rollers 20 and cleaned by the rotating motion thereof. The cleaning rollers are illustrated in more detail in FIG. 3 and are described more fully in European Patent Application No. 0 476 771. In the embodiment of FIG. 2, cleaning rollers 20, as well as a motor 21 driving same, are disposed near the end of a robot arm 22. Robot arm 22 is movable in the longitudinal direction of the milking compartment, as well as in a transverse direction and in vertical directions. Furthermore, the robot arm is also pivotable about a vertical shaft 23.

In addition to cleaning the teats, also the removing of foremilk can be accomplished with the aid of two cleaning rollers 20. Cleaning members 19 can thus be active in a cleaning mode, as well as in a foremilking mode, the foremilking mode becoming preferably operative after the cleaning mode and then often only for a fraction of the time required for the cleaning of the teat. There has to be a facility to collect the foremilk removed by means of cleaning means 19. To that end, a receiver 24 is arranged under cleaning rollers 20 and the removed foremilk is drained through a line 25 to tank 18 disposed near the rear of milking compartment 1 for this purpose.

On the side in the lower part of receiver 24 there is disposed a sensor 26 to detect whether or not foremilk has been removed. The removed foremilk runs in squirts along the front of sensor 26. When the sensor is composed of a lamp and a photoelectric cell, the foremilk can be detected by light absorption. The sensor can also be placed in the immediate vicinity of the end of a teat, so that the presence of foremilk can be detected by means of a temperature measurement. From the moment when foremilk is detected by the sensor, foremilk can be removed for a fixed time. In principle, this period of time is such that only a few squirts of foremilk, according to the volume of the teat cavity, are removed. If the foremilking manipulation has started, but after the lapse of a certain period of time, say from three to six seconds, no foremilk has been detected, the foremilking manipulation can be intensified, i.e. the pressure applied on the teats by the means for removing foremilk can be increased. The period of time during which foremilk is removed can also be adjusted for individual animals. Furthermore, the time period for the foremilking may depend on the time elapsed since the previous milking of the animal. When foremilk has been collected in receiver 24, it can be examined prior to being transported through line 25 to tank 18. The means provided to check the foremilk may be capable of sensing one or more of a number of various characteristics such as color, electric conductivity, filter resistance, etc., of the foremilk. When the system reacts sufficiently promptly, depending on the results of this check, the period of time during which foremilk is being removed from the animal's teats can be adjusted.

Figures 3, 4A:
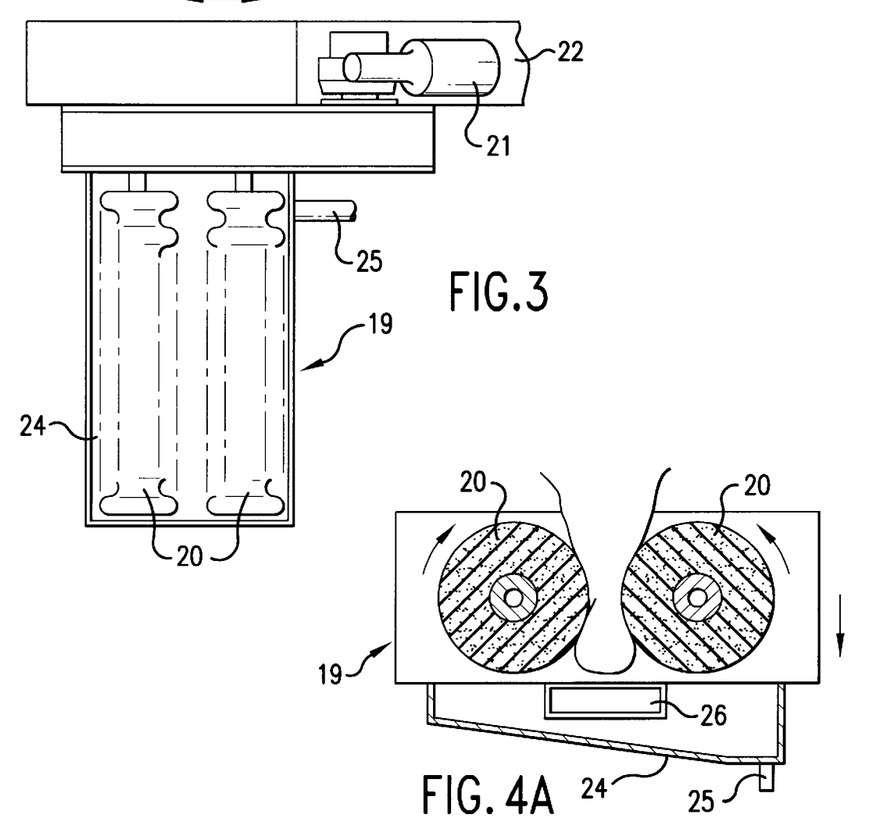
FIG. 3 is a plan view which shows the cleaning means of FIG. 2 which can be in a cleaning mode and subsequently in a foremilking mode.
FIGS. 4A and 4B show in side elevational cross-sections a first embodiment of cleaning means comprising two rotating elements, each having a circular cross-section.
Figure 4B:
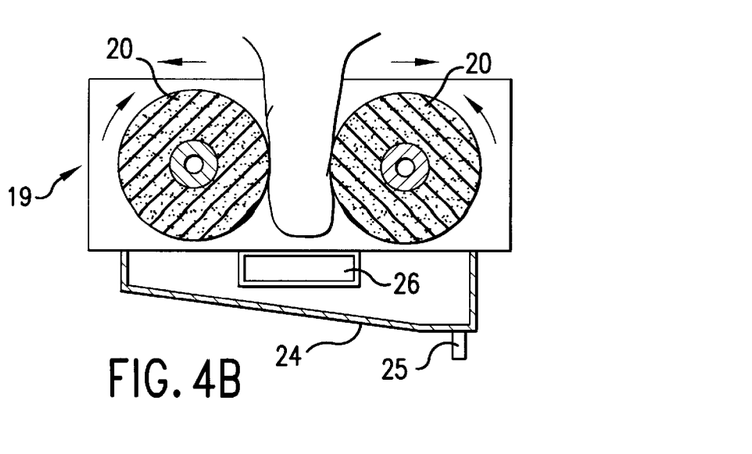

FIGS. 4A and 4B show a first embodiment of cleaning means 19. In FIG. 4A cleaning means 19 are represented in the foremilking mode, and in FIG. 4B in the cleaning mode. Cleaning means 19 comprise two cleaning rollers 20 having a circular cross-section. In the longitudinal direction, these rollers 20 extend accordion-like, that is alternating between larger and smaller diameters as indicated in FIG. 3, so that the teats drawn between the rollers 20 will come into surface contact therewith as much of rollers 20 as possible. The direction of rotation of rollers 20 is such that they move along the teat from top to bottom. In this way, both the teat is being drawn between the rollers and dirt is being discharged downwardly. If required, the rollers may be moistened, e.g. from the inside by a supply of water through a tube which is concentric with the drive shaft of the rollers. In the foremilking mode, the distance between the two rollers is less than in the cleaning mode. Because of this, the pressure exercised on the teats by rollers 20 is greater in the foremilking mode. The rotating motion of the rollers can furthermore be combined with a downward motion thereof so that only a few squirts of foremilk will be removed from the teat. In the cleaning mode represented in FIG. 4B, the distance between the rollers is somewhat increased, due to which pressure of the cleaning rollers on the teat is somewhat reduced and the teat can be cleaned without foremilk or milk or both being removed.

Figure 5:
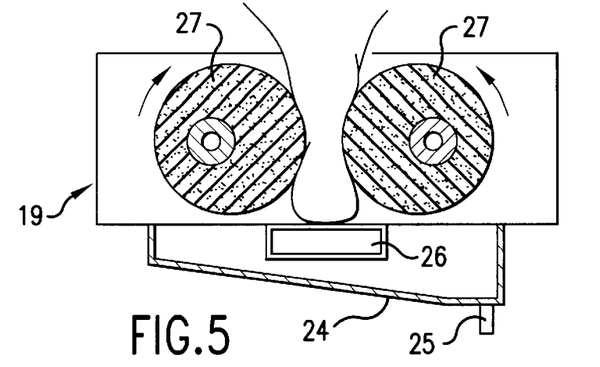
FIG. 5, in a manner similar to FIG. 4, shows cleaning means constituted by two rotating elements which have a circular cross-sections and are both driven eccentrically.

Although, in the embodiment shown in FIG. 5, the two rotating elements 27 have a circular cross-section, they are, however, driven eccentrically. In this embodiment, as in all embodiments herein, the direction of rotation of the rollers is such that they move downwards along the teat. Furthermore, because of the eccentric drive, a variable pressure is exercised on the teat. By the eccentric motion, therefore, a pulsatory action is effected on a teat, while the frequency of the pulsation can be attuned to the removing of foremilk. Due to a greater distance between the two rollers 27, possibly combined with a movability in height of cleaning means 19, rollers 27 in this configuration can be adjusted for the cleaning mode. A more or less similar action can also be obtained by placing the drive shafts' longitudinal centerlines to coincide with those of the rollers and by subsequently driving the shaft eccentrically.

Figure 6A:
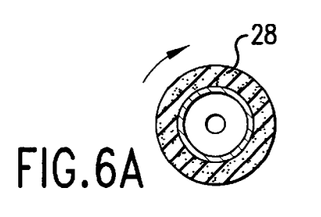
Figure 6B:
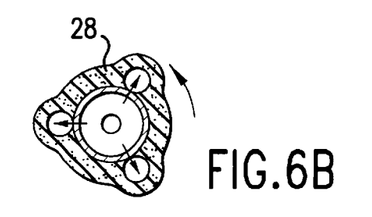

In FIGS. 6A and 6B, an individual roller 28 of a pair of rollers for the cleaning means 19 is shown. In FIG. 6A roller 28 is represented in the cleaning mode and in FIG. 6B in the foremilking mode. In this embodiment, the roller 28 is deformable. This deformability can be effected by introducing compressed air into the inside of the roller and by making on the inside a number of perforations, through which pressurized air exerts a force in radial outward direction on the material of roller 28. Due to this deformability, roller 28 assumes a non-circular configuration for the foremilking mode, so that, when driving the roller 28, a pulsatory action is imparted to the teat, the pulsating frequency of which is adjusted for the effective removal of foremilk. When a roller of the type shown in FIGS. 6A and 6B is used, the distance between the rollers can remain constant and it is not necessary that the cleaning means be movable in vertical directions. But adjustability of distance between the rollers and vertical movability can, if desired, be combined with the deformability of the roller, which can be important if the deformability of the roller is restricted.

Figure 7A:
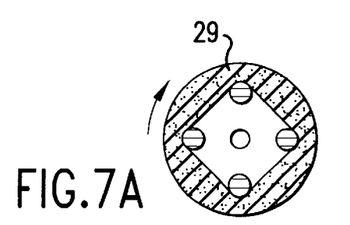
Figure 7B:
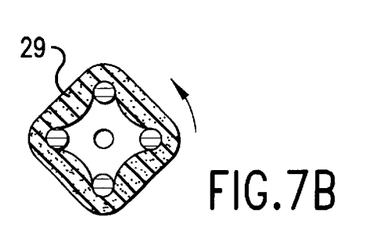

In FIGS. 7A and 7B, another embodiment of a roller 29 for the cleaning means 19 is shown. Also in this case, the roller is deformable; this time, however, air is withdrawn from the interior of roller 29, which causes it to assume a generally square shaped cross-section. In this embodiment, the distance between rollers is adjustable to ensure that, when a roller is deformed to the shape shown in FIG. 7B, nevertheless an increased pressure is applied to the teat, as required for removing the foremilk. Also in this case, the non-circular configuration will effect a pulsatory action on the teat. Both in the embodiment shown in FIGS. 6A and 6B and in that of FIGS. 7A and 7B, only one roller as well as both rollers can be deformable.

Figure 8A:
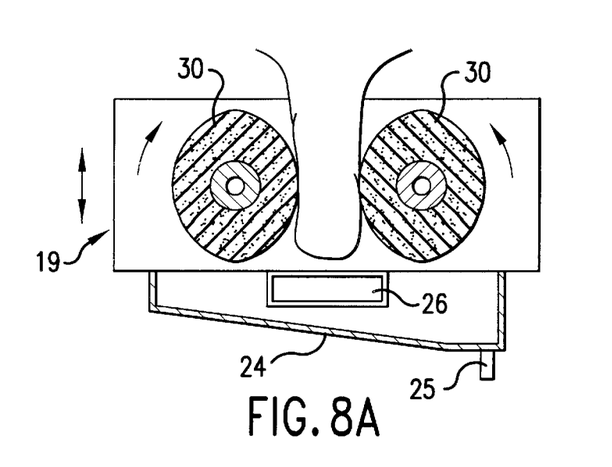
Figure 8B:
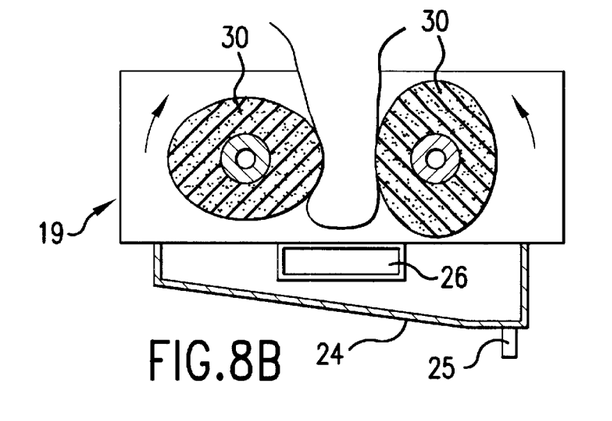

In the embodiment of the cleaning means 19 shown in FIGS. 8A and 8B, the cleaning rollers 30 have a non-circular configuration, in particular an ellipse-like or oval shape. In FIG. 8A the cleaning means 19 are shown in the foremilking mode and in FIG. 8B in the cleaning mode. In the cleaning mode, the rollers are shifted 90° in phase compared to the positions of the rollers relative to each other in the foremilking mode. Also in this embodiment, in the foremilking mode, a pulsatory action is effected on the teat, the frequency of pulsation being accommodated for the removal of foremilk. For removing foremilk, the motion of rollers 30 can be combined with a vertical motion of cleaning means 19. Due to the fact that in the cleaning mode rollers 30 are shifted in phase relative to each other, although a pulsatory action continues to be applied to the teat, it is less intensive so that no foremilk is removed and the teats are only cleaned.

Figure 9:
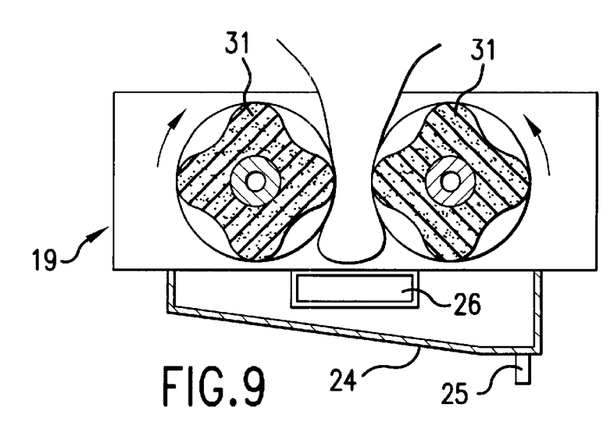
FIG. 9 shows in a side elevational cross-section view a further cleaning means, the two rotating elements each having four bulges.

In FIG. 9 an embodiment of cleaning means 19 is represented, in which embodiment the cleaning rollers 31, similar to the accordion-like structure of the rollers as shown in FIG. 3, have alternating circular cross-sections and cross-sections with four bulges. In FIG. 9, rollers 31 are depicted in the foremilking mode, whereas by shifting one of the rollers 45° relative to the other, a cleaning mode is assumed by cleaning means 19.

Figure 10A:
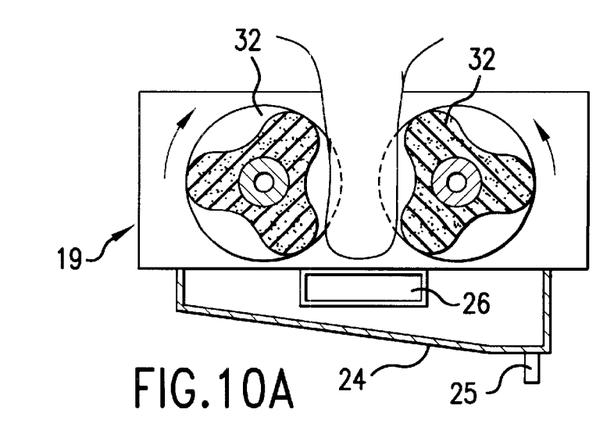
Figure 10B:
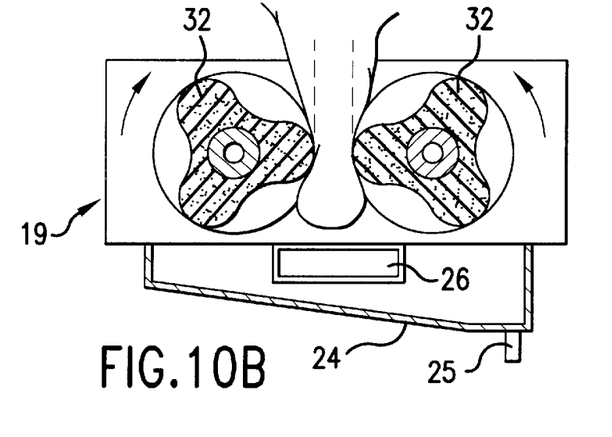
Figure 10C:
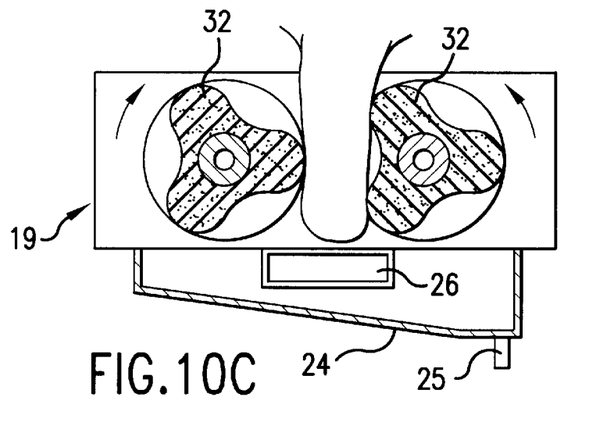

In FIGS. 10A, 10B and 10C, a further embodiment of cleaning means 19 is presented, in which embodiment the cleaning rollers 32, similar to rollers 31 have an accordion-like structure comprising alternately circular cross-sections and cross-sections with three bulges. In FIG. 10A, rollers 32 are represented in the foremilking mode, a pulsatory action being effected on the teats. When the force exerted on the teats is not sufficient for removing the foremilk, the distance between rollers 32 can be decreased somewhat, whereby a greater force is exerted on the teats. This situation is shown in FIG. 10B wherein the bulges rotate slightly closer together. In FIG. 10C, one roller is shifted 60° relative to the other, in comparison with the position of the rollers in the foremilking mode. When disposed as shown in FIG. 10C, cleaning means 19 are in the cleaning mode.

Figure 11:
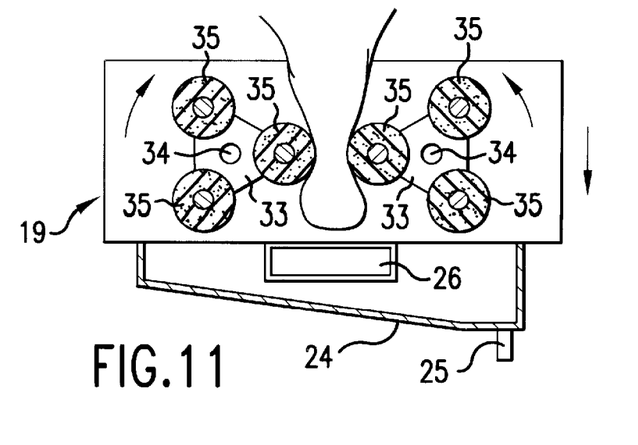
FIG. 11 shows in a side elevational cross-sectional view an embodiment of the cleaning means, wherein the rotating elements are disposed about a central shaft or axle, about and parallel to which satellite rollers are arranged.

In the embodiment of cleaning means 19 shown in FIG. 11, the rollers 33 comprise a central shaft roller or axle 34, around which are arranged three satellite rollers 35. In the cleaning mode, the satellite rollers 35 can be fixed relative to the axis of roller 34, so that upon rotation of rollers 33, as indicated by the adjacent arrows, the satellite rollers are moved along the teats in a downward direction, cleaning the teats. When the satellite rollers 35 are freely rotatable relative to their axes or to shaft 34, the rotation of rollers 33 imparts a pulsatory action on the teat, which, if necessary, by adjusting the mutual distance between the satellite rollers, is such that foremilk is removed from the teat involved.

In any design of the rollers, the distance between the rollers should preferably always be adjustable, and the cleaning means should always be vertically movable, so that in all cases the pressure exerted on the teats by the rollers, whether they are circular or non-circular or can be shifted in phase relative to each other or are deformable, can always be adjusted so that foremilk can be removed from the teat to which the rollers are applied.

Although we have disclosed the preferred embodiments of our invention, it will be understood by those skilled in the art that it is capable of other adaptations and modifications within the scope of the following claims.

Having disclosed our invention, what we claim as new and to be secured by Letters Patent of the United States is:

1. An apparatus for milking animals, such as cows, comprising:
   a milking compartment for confining the animal while it is being milked,
   a set of teat cups,
   a milking robot for automatically connecting said set of teat cups to, and disconnecting said set of teat cups from teats of an animal, and for automatically milking the animal,
   cleaning means for automatically cleaning the teats of the animal before said teat cups are connected thereto, and
   foremilking means for automatically removing foremilk from the teats of the animal, said foremilking means being activated before said teat cups are connected to the animal's teats for milking the usable milk from said animal.

2. An apparatus in accordance with claim 1, comprising a separate tank for receiving foremilk removed from the teats of the animal in said milking compartment.

3. An apparatus for milking animals, such as cows, comprising:
   a milking compartment for confining the animal while it is being milked,
   a set of teat cups,
   a milking robot for automatically connecting said set of teat cups to, and disconnecting said set of teat cups from teats of an animal, and for automatically milking the animal,
   cleaning means for automatically cleaning the teats of the animal before said teat cups are connected thereto, and
   foremilking means for automatically removing foremilk from the teats of the animal, said foremilking means being activated before said teat cups are connected to the animal's teats for milking the usable milk from said animal, and said foremilking means further comprising a second set of teat cups and installation and removal means therefor that automatically connect and disconnect said second set of teat cups to and from the teats of the animal to be milked.

4. An apparatus for milking animals, such as cows, comprising:
   a milking compartment for confining the animal while it is being milked,
   a set of teat cups,
   a milking robot for automatically connecting said set of teat cups to, and disconnecting said set of teat cups from teats of an animal, and for automatically milking the animal,
   cleaning means for automatically cleaning the teats of the animal before said teat cups are connected thereto, and
   foremilking means for automatically removing foremilk from the teats of the animal, said foremilking means being activated before said teat cups are connected to the animal's teats for milking the usable milk from said animal, and
   said cleaning means comprising said foremilking means.

5. An apparatus in accordance with claim 4, comprising modification means for shifting said cleaning means from a cleaning mode to a foremilking mode.

6. An apparatus in accordance with claim 5, wherein said modification means retains said cleaning means in a foremilking mode only for a fraction of the length of time that it retains said cleaning means in a cleaning mode.

7. An apparatus in accordance with claim 6, wherein said cleaning means comprises two rotating elements which each have a circular cross-section, and between which a teat of the animal is received for being cleaned, said modification means including a mechanism for changing the distance between the axes of rotation of said two rotating elements, said axes of rotation being nearer to each other when said cleaning means is in a foremilking mode than when said cleaning means is in a cleaning mode.

8. An apparatus in accordance with claim 6, wherein said cleaning means comprises two rotating elements having a circular cross-section, said modification means comprising an eccentric drive for driving at least one of said rotating elements eccentrically.

9. An apparatus in accordance with claim 6, wherein said cleaning means comprises two rotating elements, said modification means comprising transforming means for deforming at least one of said elements for changing said cleaning means from said cleaning mode to said foremilking mode.

10. An apparatus in accordance with claim 6, comprising two rotating elements and positioning means therefor whereby said positioning means move said two rotating elements vertically relative to a teat of the animal to be milked, said teat being disposed between said two rotating elements.

11. An apparatus in accordance with claim 4, wherein said cleaning means comprises two rotating elements for being positioned on each side of a teat of the animal, one of said elements having a plurality of bulges and recesses between said bulges, said bulges and recesses of said one rotating cleaning element cooperating with the other said cleaning element for removing foremilk from said teat disposed between said cleaning elements.

12. An apparatus in accordance with claim 4, wherein said cleaning means comprises two cleaning elements for receiving a teat of the animal between them, at least one of said cleaning elements comprising a rotating cleaning element having a non-circular cross-section.

13. An apparatus in accordance with claim 12, wherein said one rotating cleaning element comprises a bulge at its circumference.

14. An apparatus in accordance with claim 4, comprising pulsation means associated with said cleaning means, frequency control means associated with said pulsation means that performs the function of pulsating said cleaning means at a selected frequency for removing foremilk from an animal's teat with which it is in contact immediately following cleaning of said teat by said cleaning means.

15. An apparatus in accordance with claim 4, wherein said cleaning means comprises a rotating element, said rotating element comprising a central shaft and a plurality of parallel shafts, each of said plurality of parallel shafts having a roller mounted thereon.

16. An apparatus in accordance with claim 15, wherein said cleaning means comprises roller engagement means for selectively engaging said plurality of parallel rollers whereby they are rotatable about their longitudinal axes while in the cleaning mode, and are fixed in relation to said central shaft in their foremilking mode.

17. An apparatus in accordance with claim 15, comprising a variable drive for rotating said central shaft at a selected rpm, including a rpm adapted to remove foremilk from an animal's teat which is operationally engaged by said plurality of parallel rollers.

18. An apparatus in accordance with claim 4, wherein said cleaning means comprises two rotating elements, drive means for rotating said elements, and phase governing means cooperating with said drive means for controlling the relative phases of said rotating elements, the cross-sections of both of said rotating elements being non-circular.

19. An apparatus in accordance with claim 18, wherein said phase governing means is adapted to adjust the difference in the relative phases of said rotating elements.

20. An apparatus in accordance with claim 4, wherein said cleaning means comprises two rotating elements, drive means for rotating said elements, and control means, said control means associated with said rotating elements to control operational parameters consisting of one or more of the following parameters: (a) the distance between said rotating elements, (b) the rpm of said rotating elements, and (c) the vertical movement of said rotating elements relative to an animal's teat which they engage.

21. An apparatus in accordance with claim 20, comprising identification means that identifies the animal in said milking compartment, wherein said control of said operational parameter is influenced by the animal's identity.

22. An apparatus in accordance with claim 4, wherein said cleaning means comprise rotating elements which are rotatable about substantially horizontal axes, the apparatus further comprising an automatically controlled arm supporting said rotating elements, said arm being movable longitudinally, transversely, and vertically relative to said milking compartment.

23. An apparatus in accordance with claim 22, wherein when said rotating elements are disposed in a foremilking mode, said elements are moving vertically downwardly relative to said milking compartment.

24. An apparatus in accordance with claim 4, wherein said cleaning means comprises a sensor, said sensor detecting the removal of foremilk from an animal's teat engaged by said cleaning means.

25. An apparatus in accordance with claim 24, wherein said sensor is sensitive to temperature.

26. An apparatus in accordance with claim 24, comprising timing means associated with said sensor, said timing means discontinuing the foremilking operation following a selected period of time after foremilk is detected by said sensor.

27. An apparatus in accordance with claim 24, comprising timing means for detecting the amount of time which has elapsed since the foremilking operation commenced, and intensification means for intensifying the pressure exerted by said cleaning means on an animal's teat, said timing means causing said intensification means to increase the pressure exerted on said teat by said cleaning means when, after the foremilking operation has commenced and continued for a selected period of time, no foremilk has been detected by said sensor.

28. An apparatus in accordance with claim 27, wherein said sensor is adapted to detect one or more of the following parameters of foremilk removed from said teat: (a) color, (b) electric conductivity, or (c) resistance to filtration, the period of time during which foremilk is removed from the animal's teat after being detected by said sensor being a function of said parameter or parameters.

29. An apparatus in accordance with claim 4, comprising a frame, rotating elements arranged in said frame, and a sensor in said frame for detecting the removal of foremilk from an animal's teat while being engaged by said rotating elements.

30. An apparatus for milking animals, such as cows, comprising:
- a milking compartment for confining the animal while it is being milked,
- a set of teat cups,
- a milking robot for automatically connecting said set of teat cups to, and disconnecting said set of teat cups from, teats of an animal, and for automatically milking the animal,
- cleaning means for automatically cleaning the teats of the animal before said teat cups are connected thereto,
- foremilking means for automatically removing foremilk from the teats of the animal, said foremilking means being activated before said teat cups are connected to the animal's teats for milking the usable milk from said animal, and
- animal identification means for identifying the animal in said milking compartment, and
- foremilking control means for controlling the quantity of foremilk removed from the relevant animal,
- said animal identification means being operatively associated with said foremilking control means so that the quantity of foremilk removed from the animal in the milking compartment is governed by the identification of said animal.

31. An apparatus as claimed in claim 30, comprising recordation means associated with said animal identification means, said recordation means also operatively associated with said foremilking means so that the quantity of foremilk removed by said foremilking means is a function of the elapsed time since the previous milking of the relevant animal as recorded in said recordation means.

32. A method of cleaning and foremilking an animal's teats comprising the steps of: (a) placing a pair of rotating cleaning elements on each side of an animal's teat, (b) rotating said cleaning elements along the surfaces of said teat sufficiently to clean said teat, (c) using said cleaning elements to manipulate said teat in a manner that foremilk is removed therefrom, and (d) collecting and diverting said foremilk to means for collecting said foremilk.

33. A method in accordance with claim 32 that includes providing that said cleaning elements are in a first disposition for their cleaning mode and are in a second disposition for their foremilking mode.

34. A method in accordance with claim 32 that includes causing said cleaning elements to assume a first configuration for their cleaning mode, and a second different configuration for their foremilking mode.

35. A method in accordance with claim 34 comprising changing the configurations of said cleaning elements by providing that said cleaning elements are composed of an elastic material which includes a hollow portion and regulating the relative pressure of a fluid in said hollow portion, whereby the configuration of said cleaning elements are changed so as to be appropriate for cleaning said teat in a cleaning mode and for foremilking said teat in a foremilking mode.

* * * * *